APPARATUS FOR PRODUCING BRICKS

Original Filed July 28, 1969 2 Sheets-Sheet 1

INVENTOR:
JOHANN LINGL

BY Steward & Steward
his ATTORNEYS.

APPARATUS FOR PRODUCING BRICKS

Original Filed July 28, 1969 2 Sheets-Sheet 2

INVENTOR:
JOHANN LINGL

BY Steward & Steward
his ATTORNEYS.

United States Patent Office

Re. 28,160
Reissued Sept. 17, 1974

28,160

APPARATUS FOR PRODUCING BRICKS

John Lingl, Finningerstrasse 70, Neu-Ulm, Germany

Original No. 3,602,963, dated Sept. 7, 1971, Ser. No. 870,901, July 28, 1969, which is a division of application Ser. No. 583,829, Oct. 3, 1966, now Patent No. 3,468,998. Application for reissue July 27, 1973, Ser. No. 383,105

Int. Cl. B28b *13/04*

U.S. Cl. 425—316 8 Claims

Matter enclosed in heavy brackets [ ] appears in the original patent but forms no part of this reissue specification; matter printed in italics indicates the additions made by reissue.

ABSTRACT OF THE DISCLOSURE

Apparatus for cutting a continuous length or strand of compressed raw material as it comes from an extrusion press and then stacking the blocks or bricks thus cut so that the facing sides of the individual bricks lie in full engagement with each other for protection from discoloration when they are fired. The apparatus includes a pair of belt conveyors disposed in tandem for carrying the strand of material as it comes from the extruder and a cutter intermediate these first two conveyors for cutting the strand into sections. A third conveyor, which moves in the same direction as the first two, carries each section against a stop from which it is pushed laterally through a cutter frame that divides it into the desired number of bricks to form a row of such bricks. A fourth conveyor that operates intermittently is disposed at right angles to the other downstream of the cutter frame to receive the rows of bricks as successive sections are pushed through the cutter frame one after another, so that the rows of bricks coming from the cutter are pushed transversely onto the fourth conveyor. Two groups of rows are formed on this last conveyor and are spaced from each other so that the second one to be formed can be inverted onto the other by a turnover device such that the faces of the bricks in one group are accurately aligned in registry with those of the other group. A gripper assembly then picks up the double-layer flat of bricks thus formed and places it on a kiln car. As successive double-layer flats are formed they are stacked one on top of the other until a stack of the desired height is built on the kiln car.

This is *a reissue application for U.S. Pat. 3,602,963 issued Sept. 7, 1971 from application Ser. No. 870,901 filed July 28, 1969 as* a division of application, Ser. No. 583,829, filed Oct. 3, 1966, now U.S. Pat. No. 3,468,998.

The present invention relates to apparatus for producing brick and for thereafter hacking the same, and it is the principal object of the invention to hack raw or "green" brick coming from an extrusion press so that the hacks may be conveyed on a kiln car immediately into the kiln.

More particularly, it is an object of this invention to hack facing bricks which, if there is a danger that they might become discolored in burning, have to be placed in the kiln with their face sides applied against each other so that these sides will be shielded from the direct influence of the hot gases in the kiln and will thus be protected from discoloration.

Although different types of conveying apparatus have been designed for this purpose prior to this invention, these apparatus have the disadvantage that they cannot operate automatically if the hacks have to deviate from a uniform shape or pattern, for example, if a base layer of bricks is to be provided with recesses into which the arms of a brick lifter are to engage for lifting and transporting the hacks. Furthermore, these known apparatus only permit a relatively low hourly output. Thus, for example, for hacking the bricks coming from a press with an hourly of about 20,000 bricks, it is necessary to employ two of these known apparatus.

It is therefore another object of this invention to provide apparatus for producing hacks of brick of different patterns or arrangements which may also be preset automatically by suitable adjustments of a program control device.

It is another of the invention to provide apparatus for hacking brick which permits a considerably higher hourly output to be attained than that which was attainable by any of the methods and apparatus as were known prior to this invention so that a single apparatus will suffice for hacking the entire output of a brick press. This press which does not constitute a part of the invention should be one of the type in which the raw material is compressed to such an extent that, when it is thereafter divided into individual raw bricks, these bricks will resist practically any deformation during the subsequent hacking operation.

A further object of the invention consists in the combination of providing a very economical method of producing raw bricks from a strand of material coming from an extrusion press with a likewise very economical method of thereafter hacking these bricks in a manner similar to that as described and claimed in my Pat. No. 3,388,815. Therefore, while Pat. No. 3,388,815 only relates to a method and apparatus for hacking the bricks, the present invention relates to apparatus for cutting the strand of compressed material into individual bricks and to the combination of this apparatus with apparatus for thereafter hacking the bricks in such a manner that the face sides of the individual bricks will lie directly on, and in registry with, each other and will thus be protected from discoloration in the subsequent burning operation.

In the operation of apparatus according to the invention, the strand of compressed material is moved on conveyors from the extrusion press in one direction and cut into sections of a length substantially equal ot the length of each row of bricks to be formed. Another conveyor moves the sections successively in the same direction against a back stop, from which they are pushed laterally through a vertical cutter frame, in which each section of material is cut up by cutter wires into a row of individual raw bricks. Successive rows of bricks are moved against each other as they come from the cutter frame onto another conveyor which extends at right angles to the first sequence of conveyors. A first layer of bricks is formed when a predetermined number of parallel rows have been pushed onto the last-mentioned conveyor. This first layer is then moved a set distance along this last conveyor and another group of rows is pushed onto the conveyor to form a second layer identical with the first. The second layer is then swung by means of a turnover device about an angle of approximately 180°, so that it will be deposited face down on the first layer with its bricks in accurate vertical alignment with those in the first layer.

The double-layer flat thus formed consists of double-layer rows of bricks that extend longitudinally, as well as laterally, of the conveyor on which they are then supported. This double-layer flat is then grasped by a gripper assembly consisting of a plurality of individual grippers, which grasps the ends of each longitudinal double-layer row of bricks, and the entire flat is lifted off the conveyor. While thus suspended the flat of bricks, the individual grippers of this assembly may be moved for a predetermined distance laterally away from each other so that the individual double-layer rows of the flat will also be spaced at such a distance from each other and will then be deposited in such a position, for example, on a kiln car or other support.

The gripper assembly which is employed is preferably designed substantially as described and claimed in my previous U.S. Pat. No. 3,270,897.

Apparatus according to the present invention has the advantage of being much more simple than the apparatus as described in my Pat. No. 3,388,815 since by the operation of cutting the raw bricks apart from the strand of material coming from the extrusion press in a position in longitudinal alignment with the further movement of the brick rows and the subsequent operation of assembling them into double-layer flats, the relatively complicated mechanism for shifting the rows of bricks alternately from one conveyor to two other conveyors at both sides thereof as described in U.S. Pat. No. 3,388,815 will be omitted. It is evident, moreover, that the apparatus of the present invention is also considerably less expensive and more reliable in operation.

In order to facilitate and improve the cutting operation, it is advisable after each section or block of material has been cut off from the strand coming from the extrusion press to pass this block underneath a row of notching rolls toward the cutting wires. These notching rolls which are located directly upstream of the cutting wires at a distance from each other equal to the width of a brick will press a plurality of grooves or notches into the upper surface of the block and will thereby prevent frayed edges from being formed on the individual bricks during the subsequent cutting operation.

For pushing each block through the cutting wire after being moved by a conveyor against a fixed back stop, a suitable pusher is preferably pressed against one lateral side of the block. In order to prevent the rear edges of the raw bricks from being frayed by the cutting wires, it is advisable not to push the blocks completely but only for a certain distance through the cutting wires by means of the pusher and then to withdraw the pusher and move the next block against the back stop, this next block being pressed laterally against the preceding one in order to push it the rest of the way through the cutter frame to complete the cut.

The gripper assembly which is employed should in principle be similar to the gripper assembly according to my previous U.S. Pat. No. 3,270,897 and is preferably designed so as to be able to pick up two successive double-layer flats of bricks simultaneously and to transfer them to the place where they are to be deposited. During this transfer, it is desirable to separate the individual longitudinal double-layer rows for a certain distance from each other.

For carrying out the cutting operation in accordance with the invention, it is advisable to employ a vertical cutting frame in which the cutting wires are mounted so as likewise to extend in a vertical direction and at a distance from each other equal to the width of a brick. This frame preferably also serves as a support for the notching rolls, and for this purpose its lateral frame members carry a pair of brackets on which the common shaft of the notching rolls is mounted.

The turnover device preferably consists of a frame which is pivotable about the axis of a shaft. Two opposite sides of this frame preferably form gripping plates and are movable relative to each other. For adjusting the turnover device to at least two different levels for depositing at least two layers of brick rows on top of each other, the shaft of the frame is rotatably mounted on one end of a pair of arms which is pivotable at the other end about a fixed axis, for example, by means of a pair of pneumatic cylinder-and-piston units.

The apparatus also includes four belt conveyors the first three of which extend substantially in the same direction. The first of these conveyors is driven continuously in accordance with the rate of extrusion of the press and it is followed by the second conveyor which is driven at a higher speed than the first, while the following third conveyor is driven intermittently in the same manner as the fourth conveyor which extends substantially at a right angle to the preceding conveyor.

The various features of the apparatus according to the invention will become more clearly apparent from the following detailed description thereof which is to be read with reference to the accompanying drawings, in which:

FIG. 1 shows a perspective view of the apparatus, while

Figure 1:
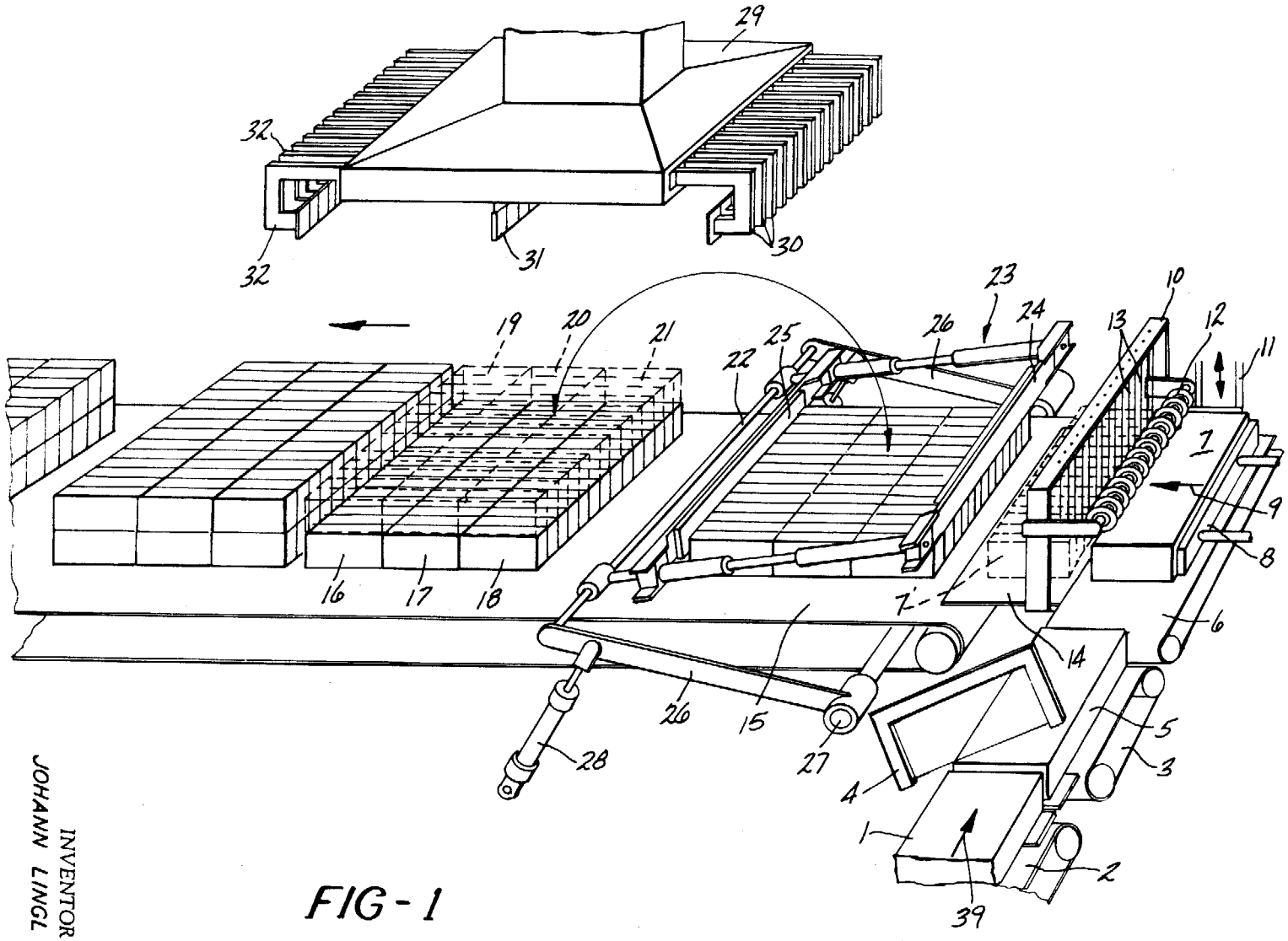

The apparatus according to the invention as illustrated in FIG. 1 comprises first a belt conveyor 2 which is adapted to convey the compressed strand 1 of clay or similar material from the extrusion press (not shown) in which it has been produced in the direction of the arrow 39. At the end of this conveyor 2, the strand 1 is cut into individual sections or blocks 5 of a certain length by means of a cutting wire 4, as merely indicated diagrammatically. These blocks 5 then pass upon a second belt conveyor 3 which is driven at a higher speed than the conveyor 2 and moves the blocks 5 to a further belt conveyor 6 which is driven intermittently. The conveyor 6 thus moves each block 5 to a position 7 in which the block is stopped by a back stop 11 which is designed, for example, in the form of a switch which may also stop the movement of the conveyor 6 and then start the operation of a pusher 8 which acts upon one lateral side of block 5 and pushes the same in the direction of the arrow 9 towards a cutter frame 10. This cutter frame 10 is provided with a plurality of vertical cutting wires 13 which are spaced from each other at a distance equal to the width of a brick. The lateral arms of the cutter frame 10 carry a pair of brackets on which the common shaft of a plurality of notching rolls 12 is mounted. These notching rolls 12 are located directly in line with, and upstream of the individual cutting wires 13 and therefore they are likewise spaced from each other at a distance equal to the width of a brick.

By means of the pusher 8, the block 7 is then pushed through the cutting wires 13 up to a point near its rear edges. In order to prevent the rear edges of the raw bricks which are thus formed from being frayed or ripped by the cutting wires 13 at the end of the cutting operation, the last part of the pushing operation is not carried out by the pusher 8 itself, but by the next following block 5 which in the meantime has been moved forwardly and against the back stop 11 by the conveyor 6. This next block 5 likewise pushed by the pusher 8 in the dieection of the arrow 9 and thus against the rear side of the preceding block 7' (shown in the broken lines), thereby pushed completely through the cutting wires 13 so that a row of individual bricks is then formed on a platform 14 at the other side of the cutting wires.

Each individual row of bricks is pushed by the succeeding row successively from this platform 14 upon a further conveyor belt 15 which is likewise moved intermittently. The first three successive rows of bricks, which are pushed on this belt 15 against each other, are moved by the belt to the positions 16, 17, and 18, these three rows forming the first layer of a double-layer flat. The next three row, which form the second layer, are then advanced on belt 15 to a position in which they may be gripped by the turnover device 23. This turnover device 23 consists of the two parallel gripper plates 24 and 25 which are movable relative to each other by a pair of lateral pneumatically controlled cylinder-and-piston units so as to grip or release, for example, three rows of bricks. For swinging the turnover device 23 from one side to the other so as to deposit the second layer of bricks 19, 20, 21 (shown in broken lines) facedown on the first layer 16, 17, 18, this device is pivotable by suitable driving means, not shown, about the axis of a shaft 22 which is mounted on one end of pair of arms 26. In order to permit the first layer of bricks 16, 17, 18 to be moved by the conveyor belt 15 underneath the turnover device 23 to the position as shown in FIG. 1 and also to permit the next three rows of bricks on belt 15 to be gripped by the gripping plates 24 and 25 while these plates are disposed within vertical planes, and then to be swung over by the turnover device 23 from the level of belt 15 at the right side of the shaft 22 of the turnover device 23 to the hgiher level of the second layer of bricks 19, 20, 21 on top of the first layer 16, 17, 18 at the left side of shaft 22, the two arms 26 are pivotable about an axis 27 by means of a pair of pneumatic cylinder-and-piston units 28. A cranklike movement is thus carried out by shaft 22 and arms 26 which permits the second layer of bricks 19, 20, 21 to be picked up by the turnover device 23 in a horizontal position at the lower level on belt 15 and, after being swung over, to be deposited likewise in a horizontal position but at a higher level upon the first layer 16, 17, 18.

Each double-layer flat respectively of brick rows which is thus formed is then further conveyed along the conveyor 15. Two successive double-layer flats respectively then pass underneath a gripper assembly 29 which is provided with individual pairs of outer grippers arm 30 and 32 and intermediate tongues 31 against which the longitudinal rows of bricks are pressed by gripping plates on the individual gripper arms 30 and 32 after the gripper assembly 29 has been lowered. This gripper assembly 29 then conveys these two double-layer flats respectively to any desired place and deposits them thereon. Of course, in order for the gripper plates on the arms 30 and 32 together with the intermediate tongues to be capable of gripping two superimposed layers of bricks simultaneously, they should be twice as high as shown in FIG. 1 and also twice as high as the gripper plates 24 and 25 of the turnover device 23.

Figure 2:
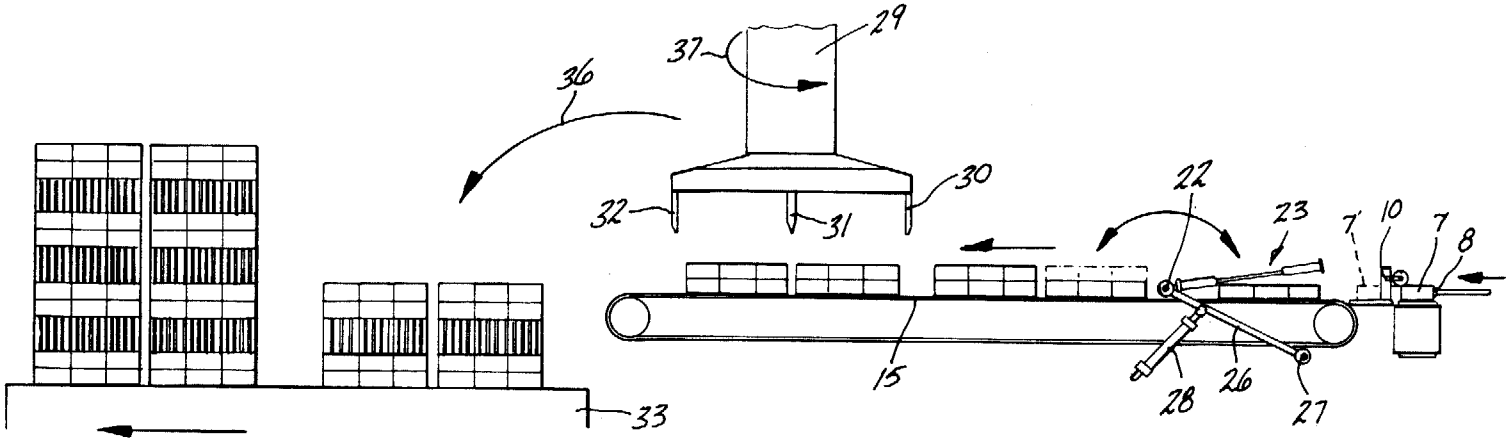
FIG. 2 shows a diagrammatic side view of the apparatus which illustrates its principle of operation.

The operation of the apparatus according to the invention is more clearly illustrated in FIG. 2 which shows that the gripper assembly 29 may first be moved in the direction of the arrow 36 so as to deposit one double-layer of bricks, for example, on a kiln car 33'. The first double-layer flat forms a base for a stack of bricks. Then after the gripping assembly 29 has picked up another double-layer it may be turned 90° about its axis, as indicated by the arrow 37, so as to stack this second double-layer on the first double-layer at right angles thereto. These operations may be repeated as often as desired with the following double-layer groups until the stack of crosshacked brick layers has reached the desired height.

In conclusion it may be mentioned that the gripper assembly may also be of a different type of construction than that described above, although preferably it should be designed so as to permit its individual gripper arms to be adjustable to different distances from each other in a direction vertical to the plane of FIG. 2 so that the individual rows of bricks may be separated from each other as much as necessary for being properly exposed to the oven gases and also for being easily picked up forklifts.

Although my invention has been illustrated and described with reference to the preferred embodiment thereof, I wish to have it understood that it is no way limited to the details to such embodiment but is capable of numerous modifications within the scope of the appended claims.

Having thus fully disclosed my invention, what I claim is:

1. Apparatus for producing raw bricks from a strand of compressed material immerging from an extrusion press comprising a first and a second belt conveyor in tandem for conveying said strand in one direction from the extrusion press, means intermediate said conveyors for cutting said strand into sections of a length substantially equal to the length of a row of bricks to be produced, a third belt conveyor adapted to be driven substantially in the same direction as said first and second conveyors a back stop at the end of said third conveyor a cutter frame at one lateral side of said third conveyor a platform adjacent to the downstream end of said cutter frame, a fourth belt conveyor extending at substantially right angles to said other conveyors pusher means for successively pushing said sections in a lateral direction off said third conveyor and through said cutter frame, each said section being divided by said cutter frame into a row of separate bricks extending transversely to said fourth conveyor and for also pushing said transverse rows of said group laterally across said platform onto said fourth conveyor to form brick rows extending transversely thereof, said fourth conveyor being intermittently operable in cooperation with said pusher means to form two identical groups of said brick rows spaced from each other along said fourth conveyor said bricks in each of said groups also forming rows extending longitudinally of said fourth conveyor a turnover device having an axis, above and transverse to said fourth conveyor and intermediate the positions of said groups of brick rows on said fourth conveyor said turnover device having gripping means for gripping one of said groups of brick rows and for swinging the same off said fourth conveyor through an angle of substantially 180° about said axis in the direction toward and upon and in registry with and facedown on said other group so as to form a double-layer flat in which the face sides of the bricks of both layers engage upon each other forming double-layer rows of said bricks extending longitudinally of said conveyor a gripper assembly having a plurality of individual pairs of gripper arms, each of said pairs of gripper arms being capable of grasping one of said double-layer longitudinal rows at its ends with sufficient force to hold it when unsupported from below, such that at least one double-layer flat is gripped by said gripper assembly, means for lifting said gripper assembly so as to lift at least said entire double-layer flat off said fourth conveyor and means for conveying at least said one double-layer flat to another support and for then releasing said flat from said gripper assembly so as to form a base layer of a hack on which other double-layer flats may subsequently be deposited to increase the height of said hack.

2. An apparatus as defined in claim 1, further comprising means for drawing apart said individual pairs of gripper arms after lifting said double-layer flat off said fourth conveyor so as to space the adjacent longitudinal rows of said double-layer group at a certain distance from each other in which condition said double-layer flat is then conveyed to and deposited on said support.

3. An apparatus as defined in claim 1, in which said cutter frame comprises a vertical frame and a plurality of vertical cutting wires mounted on the upper and lower sides of said frame and spaced from each other at a distance equal to the width of one brick.

4. An apparatus as defined in claim 3, further comprising at least one shaft mounted on the lateral sides of said frame, and a plurality of notching rolls equal to the number of cutting wires mounted on said shaft and disposed upstream of and in alignment with said cutting wires for notching at least one horizontal side of each of said sections before said section is cut by said wires.

5. An apparatus as defined in claim 1, in which said turnover device comprises a frame adapted to pivot about said axis and said gripping means comprises two opposite frame members extending transversely to said fourth conveyor and forming gripping plates and two lateral frame members connecting said transverse frame members to each other, and means for equally varying the effective length of both of said lateral frame members.

6. An apparatus as defined in claim 1, in which said axis of said turnover device forms the axis of a shaft, a pair of arms each mounted at one end on said shaft, means for mounting the other of each of said arms so as to be pivotable for pivoting said arms within vertical planes extending substantially parallel to the lateral sides of said fourth conveyor and means connected to said arms for pivoting the same and for thereby lifting and lowering said shaft.

7. An apparatus as defined in claim 1, in which said first and second conveyors are adapted to be driven continuously and said second conveyor is driven at a higher speed than said first conveyor and said third and fourth conveyors are driven intermittently.

*8. Apparatus for producing raw bricks from a strand of compressed material emerging from an extrusion press and for backing said bricks, said apparatus comprising: means for conveying the strand in one direction and for*

*cutting the strand into sections of a length substantially equal to the length of a row of bricks to be produced,*

*a cutter means having a plurality of cutting wires spaced apart from one another by an amount substantially equal to the width of one brick in said row of bricks,*

*means for successively positioning said sections opposite said cutter means,*

*pusher means for successively pushing said sections in a second direction substantially perpendicular with respect to said one direction through said cutter means thereby dividing each section into a row of separate bricks,*

*conveyor means disposed to receive said rows of separate bricks from said cutter means, for transporting said rows of bricks along said second direction and for forming flats of bricks therefrom,*

*turnover means disposed for gripping selected ones of said flats of bricks and turning them over face down onto other corresponding flats to form double-layer flats of bricks in which the face sides of the bricks of both layers engage upon each other,*

*gripper means for gripping the narrow front and rear ends of each row of bricks in at least one of said double-layer flats of bricks,*

*means for lifting the gripped double-layer flat and positioning it over the desired location of a hack of bricks, and*

*means for releasing the gripped double-layer flat and depositing it at said location to build said hack of bricks.*

References Cited

The following references, cited by the Examiner, are of record in the patented file of this patent or the original patent.

UNITED STATES PATENTS

| | | | |
|---|---|---|---|
| 3,350,757 | 11/1967 | Bowles | 425—301 X |
| 3,478,397 | 11/1969 | Pearne et al. | 425—404 X |
| 3,487,954 | 1/1970 | Pearne et al. | 425—404 X |

R. SPENCER ANNEAR, Primary Examiner

M. ROSENBAUM, Assistant Examiner

U.S. Cl. X.R.

214—6 A; 264—157; 425—377, 455